Aug. 4, 1953 G. J. POIVILLIERS 2,647,317
APPARATUS FOR THE RESTITUTION OF IMAGES
Filed Aug. 16, 1949 6 Sheets-Sheet 4

INVENTOR
Georges Jean Poivilliers.
BY Cameron, Kerkam & Sutton
ATTORNEYS

Aug. 4, 1953  G. J. POIVILLIERS  2,647,317
APPARATUS FOR THE RESTITUTION OF IMAGES
Filed Aug. 16, 1949  6 Sheets-Sheet 6

INVENTOR
Georges Jean Poivilliers.
BY Cameron, Kerkam + Sutton
ATTORNEYS

Patented Aug. 4, 1953

2,647,317

UNITED STATES PATENT OFFICE 2,647,317

APPARATUS FOR THE RESTITUTION OF IMAGES

Georges Jean Poivilliers, Neuilly-sur-Seine, France

Application August 16, 1949, Serial No. 110,653
In France August 26, 1948

6 Claims. (Cl. 33—20)

The present invention relates to an apparatus for the restitution of images based on the materialization in space of pairs of homologous perspective rays by means of an assembly of two rectilinear rods, each rod being movable around a point of articulation which materializes the corresponding point of sight, and also pivoted respectively:

(a) On a support which is movable in a plane variable in position according to the principal distance and the inclination in space of the picture taking camera, the center of articulation with the support materializing the image of the point under observation, hereinafter designated $m$; and (b) On a support common to both rods which is movable, at the same time, both parallel and perpendicular to a reference plane of the restitution, the center of articulation with this support materializing the position of the restored point, hereinafter designated M, with respect to the corresponding point of sight.

Devices are known wherein each of the articulations corresponding to $m$ materializing the images causes relative displacement of the photographs which are to be restored and of the corresponding objective of the binocular viewing telescope in a plane parallel to its own plane of movement, that is, in a plane variable as to distance and inclination with respect to the body of the viewing telescope.

As a result, the viewing telescope must necessarily include a certain number of optical pieces movable in such manner as to assure its focussing regardless of the position of the photograph which is relatively variable with respect to said telescope.

The utilization of these movable optical pieces in the telescope necessarily results in very great complication of the telescope.

It is also known that restitutional devices require means for correcting distortion of the photographic lenses, such distortion corresponding to a variation of the principal distance with the inclination of the perspective ray on the principal axis.

Distortion correcting means are known wherein this correction is accomplished by means of a revolving cam which displaces the articulation of the image point normally to its plane of movement, as a function of the inclination of the rod materializing the perspective ray in said plane. However, these revolving cams are designed for a given type of lens and cannot readily be modified so as to take into account the distortion irregularities of different lenses of the same type.

As a result, the operator is forced either to tolerate a certain distortion, or to use a set of widely different revolving cams so as to be able to correct the said distortions.

All of this complicates the restitutional devices still further, and also obliges the operator to lose valuable time in adapting the different cams to the necessities of his work.

Restitutional devices of the same type are also known wherein the orientation in space is effected about axes situated substantially at the level of the point of sight. As a result, the adjustment of such orientation requires a modification of the position of the tracer on the reference plane, which further complicates usage of such apparatus.

The present invention aims at remedying these drawbacks.

To this end, the invention pertains to a method of restitution originating from a pair of stereoscopic photographs wherein a pair of homologous perspective rays are materialized in space by means of an arrangement of two straight rods, each of which is movable about a point S which materializes the corresponding point of sight, each rod also being pivoted as follows: on one hand, on a second point $m$ which materializes the image of the point sighted and which is movable in a plane variable in position according to the principal distance (the focal distance of the picture taking camera) and the inclination in space of the camera; and, on the other hand, on a third point M which is movable simultaneously in and perpendicular to a plane parallel to the restitutional reference plane. This method is characterized by the fact that the movement of the pair of stereoscopic photographs is subject to the movement of the points $m$ materializing the two images of the observed point in such manner that the photographs are moved in a plane which is fixed with respect to the body of the viewing telescope, irrespective of the magnitude of the principal distance and of the inclinations of the picture taking camera. This arrangement makes it possible to simplify the viewing telescope so that the latter no longer need comprise the numerous movable optical parts required in the other known devices, wherein the movement of the points $m$ materializing the two images of the restored point causes relative movement of the photographs to be restored and of the corresponding objective of the viewing telescope in a plane which is variable in both remoteness and inclination.

Moreover, the invention also covers an apparatus which permits a particularly advantageous and efficient application of the preceding method or a similar method characterized by the fact that each of the pivot points $m$, materializing the image of the point sighted, is borne by a mobile carriage on a bridge which moves in a direction perpendicular thereto, which bridge may be tilted about perpendicular axes passing through the articulation S materializing the point sight, in such a manner that the inclinations of the plane of movement of each of the articulations $m$ materializing the image of the observed point are adjustable, while each photograph is borne by a carriage integral with the above bridge and is parallel to the guides of the bridge so that each photograph moves, on one hand, in a plane parallel to said guides at the time of movement of the bridge and, on the other hand, receives a second movement in its plane, normal to the foregoing movement, by means of a flexible connection which joins it to the carriage bearing the articulation $m$ that materializes the image of the observed point. The result is that each photograph thus participates in its own plane in the two movements of articulation $m$, which makes it possible to review the photograph under consideration under a sighting telescope and to view the image of a point while the center of articulation $m$ materializing the image of the point under observation occupies the position in space which it had at the moment of the taking of the photograph.

The invention also concerns a restitutional device wherein pairs of homologous, perspective rays are materialized in space by means of an arrangement of two rectilinear and movable rods which is characterized by the fact that the variation of the principal distance is controlled by the variation of the distance from the articulation $m$ materializing the image of the observed point to the articulation S materializing the point of sight, in such manner that the means for correcting the distortion of the photographic objective, which distortion is the result of a variation of the principal distance due to the inclination of the perspective ray on the principal axis, is independent of the orientation of the plane determined by the principal axis and the materialized perspective ray. This makes it possible to utilize a distortion-correcting device which depends only on a single parameter and, as a result, is easily adjusted so as to take into account the individual irregularities of different lenses.

The invention further concerns a restitutional device wherein pairs of homologous perspective rays are materialized in space by means of an arrangement of two rectilinear and movable rods which is characterized by the fact that the frame carrying both the photographs and the telescope rests on the support of the restitutional reference plane by means of regulating elements, such as set screws, which are disposed substantially at the level of the restored space. This makes it possible to bring about corrections in the spacial orientation of the restitution without any practical modification of the planimetric projection, whereas in the known devices, wherein the orientation in space is accomplished around axes situated substantially at the level of the point of sight, such adjustment of the orientation entails a modification of the position of the tracer on the reference plane.

The invention also extends to the characteristics hereinafter described as well as to their various possible combinations.

A restitutional apparatus conforming to the present invention is represented, as an example, in the accompanying drawings, wherein.

Figure 1:
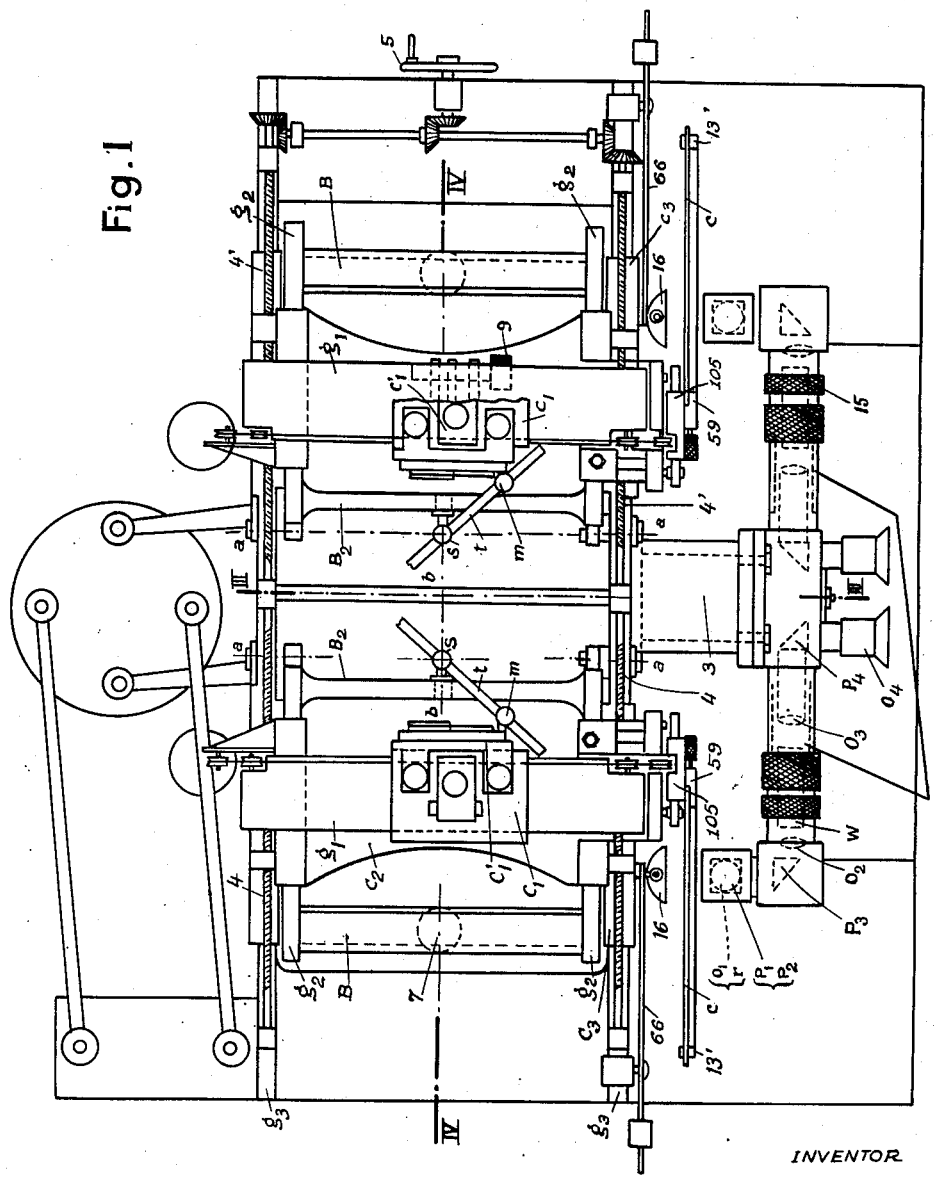
Fig. 1 is a schematic plan view of the restitutional apparatus.
Figure 2:
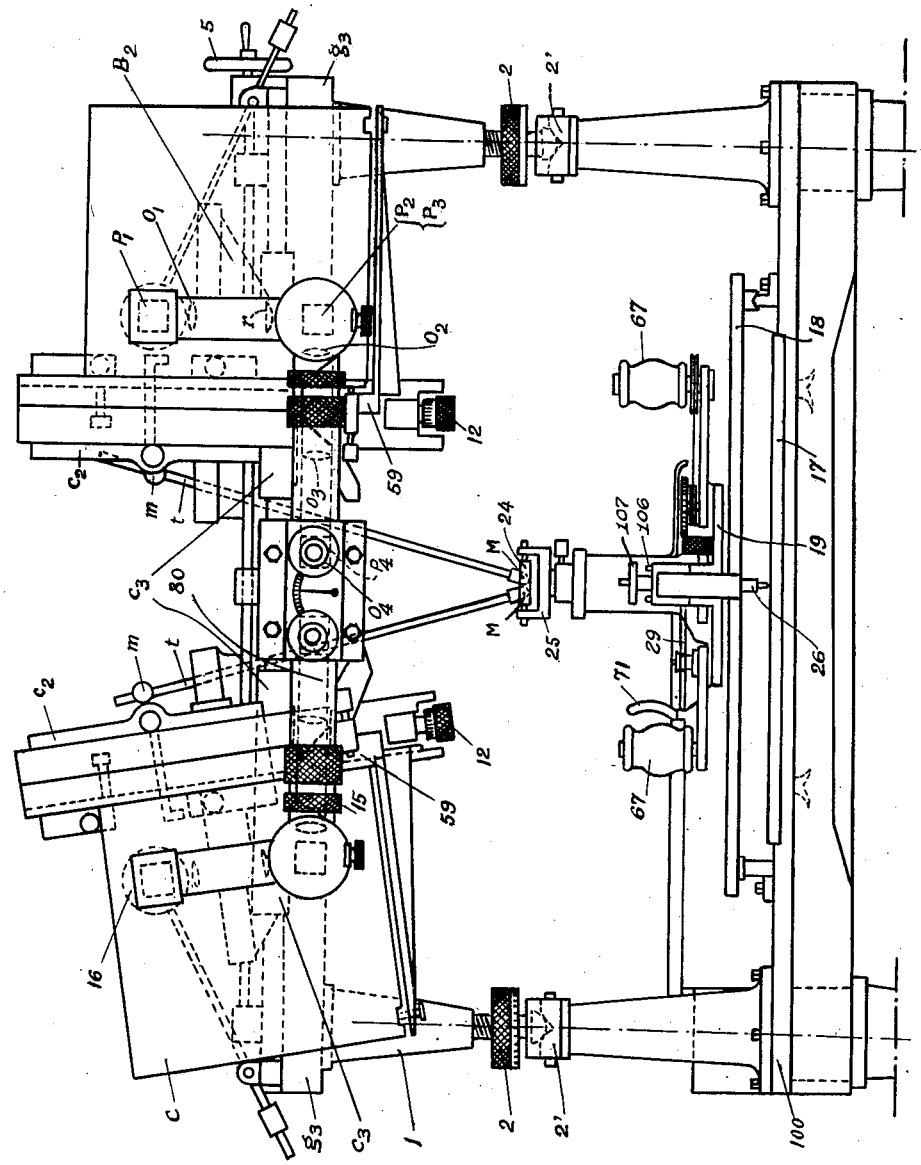
Fig. 2 is a schematic elevation view of the apparatus of Fig. 1.

The restitutional apparatus shown in Figs. 1–4 comprises a horizontal table 100 on which rest a device 80 for stereoscopic observation of a pair of photographs and a tracing or plotting device 19 (Fig. 2).

The stereoscopic observation device includes a main frame 1 which rests on the table 100 through the set screws 2, the latter forming lifting jacks and bearing against the pillars 2' which are fixed to the table 100. This frame 1 has the shape of a rectangular scaffold carrying in front and in back two parallel slides $g_3$ which are cross-braced at their centers (Fig. 1).

On the slides are supported two carriages $C_3$ which can be moved in opposite directions to one another by means of oppositely threaded screws 4, 4' operated by a handle 5.

Each of the carriages $C_3$ carries a cradle B which can tilt about an end axis $a$—$a$. This tilting movement is controlled by a support screw 7.

Each cradle B carries, on its upper portion, two frontal parallel slides $g_2$ on which rolls a carriage $C_2$ forming a bridge (Fig. 2). This carriage $C_2$ supports a slide $g_1$ which can be inclined about the frontal axis $b$—$b$ of a pivot $p$ perpendicular to the end axis $a$—$a$, said pivot being positioned at the lower central portion of slide $g_1$ in the same horizontal plane as the axis $a$—$a$. The prolongation of the axis $b$—$b$ meets the axis $a$—$a$ in the point S (Fig. 1) which materializes the point of sight. Inclination of the slide $g_1$ relative to carriage $C_2$ about the pivot $p$ is permitted by providing the carriage $C_2$ with an arcuate slot 101 (Fig. 3), concentric with the axis $b$—$b$ of pivot $p$, in which is engaged a locking bolt 102 mounted in one of the series of perforations 50 in part 85 hereinafter described, and is controlled by a screw mechanism 9 and a return spring. On each slide $g_1$ there moves a carriage $C_1$ which carries the articulation $m$, the center of which materializes the point of the photograph (the image of the point under observation).

The inclination with respect to frame 1 of the plane passed through the center of articulation $m$ (the image point) is regulated, in one direction, by the tilting of the cradle B about the end axis $a$—$a$ (convergence) by means of the support screw 7 and, in the perpendicular direction, by the tilting about the frontal axis $b$—$b$ (transverse inclination) by means of the mechanism 9.

The displacement of the articulations $m$ materializing the point of the photograph is assured by the rods $t$ which are able to pivot in space about the articulations S materializing the point of sight, each of these articulations S being carried by a cross-bar $B_2$ of the cradle B.

The articulations S and $m$ materializing the point of sight and the image of the observed point, respectively, are schematically represented in the drawings by sliding ball-and-socket joints, i. e., universal joints of the ball-and-socket type wherein the balls slidably receive the rods $t$, although they may equally well consist of sliding sleeve or roller type universal joints.

The distance between the plane passed through the center of articulation $m$ materializing the image of the observed point and the center of the corresponding articulation S materializing the point of sight (the principal distance), is adjustable in a manner such that it may be rendered equal to the principal distance of the camera which was used for taking the photographs.

Figure 3:
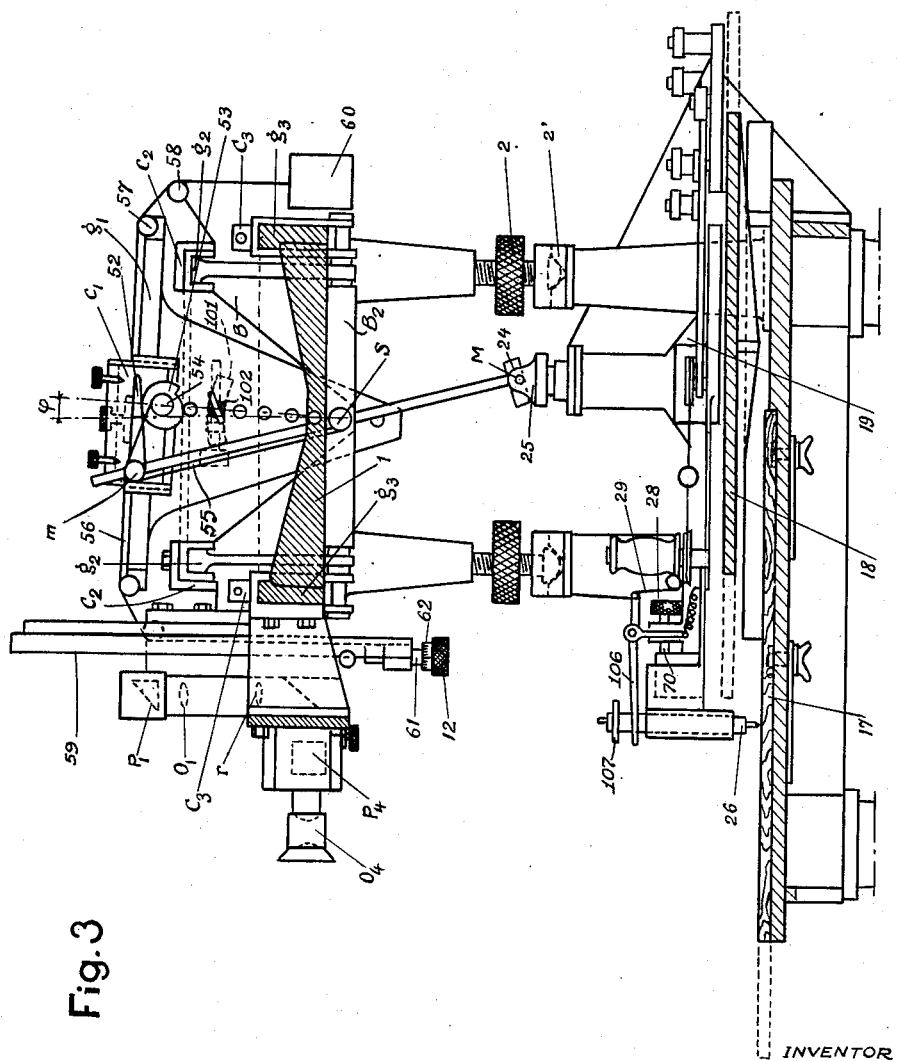
Fig. 3 is a transverse median sectional view of the apparatus of Fig. 1 taken along the line III—III in said figure.
Figure 4:
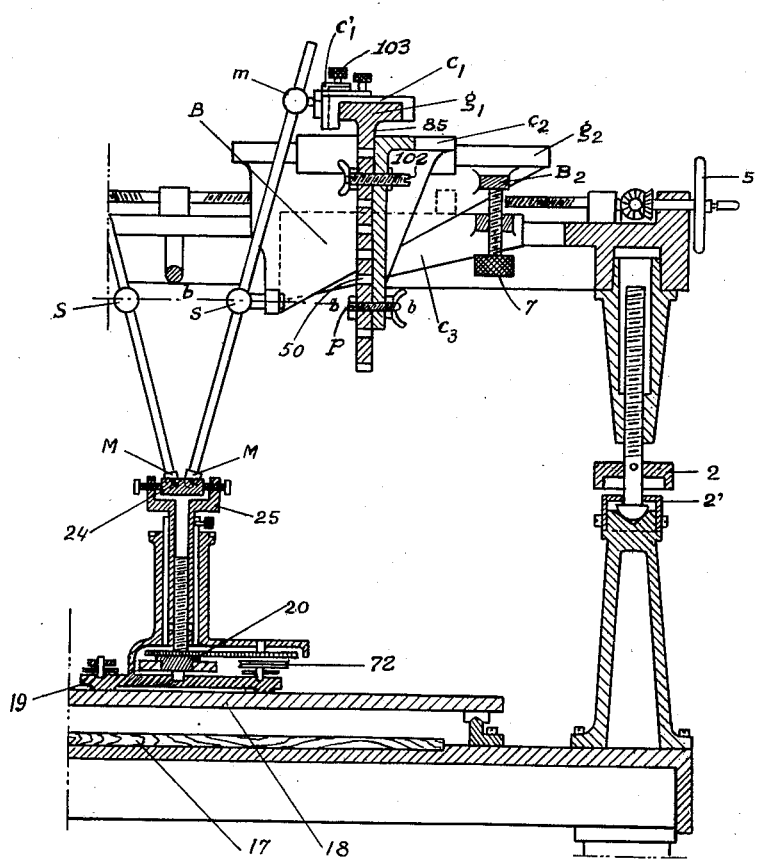
Fig. 4 is a fragmentary longitudinal median sectional view of the apparatus of Fig. 1 taken along the line IV—IV in said figure.
Figure 6:
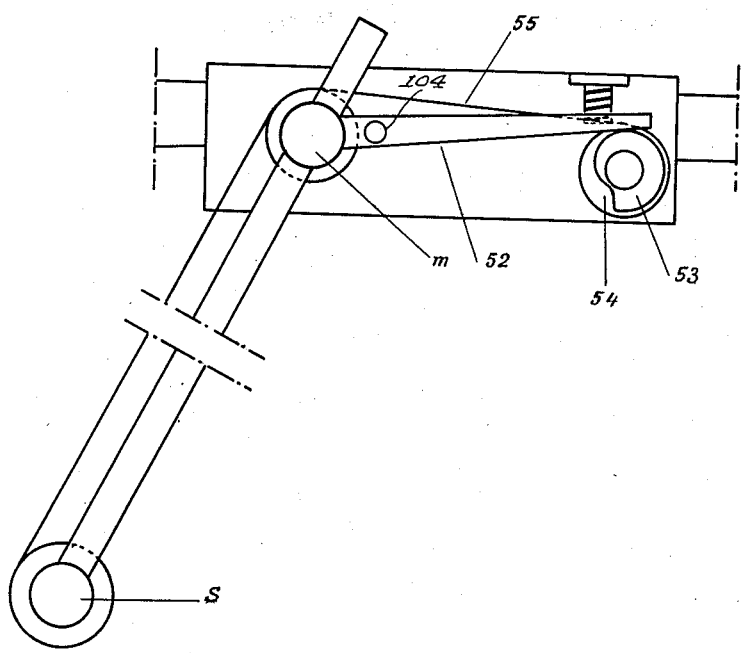
Fig. 6 is an explanatory diagram of the distortion-correcting means of the apparatus of Fig. 1.

For this purpose, on one hand, the part 85 supporting the slide $g_1$ carries a series of perforations 50 arranged in step-wise formation in a direction normal to the slide $g_2$ which can be engaged at will on the tilting axis $b$—$b$ (Fig. 4), while, on the other hand, the articulation $m$ materializing the image of the observed point is supported by a slide $C'_1$ which can be moved micrometrically on the carriage $C_1$ in a direction normal to the slide $g_1$ by means of the screw 103. Finally, the articulation $m$ materializing the image of the observed point is fixed on the slide $C'_1$ by means of an arm 52 pivoted intermediate its ends at 104 on said slide and operated by a cam 53 (Fig. 3). This cam 53 is mounted on a drum 54 on which is wound a cable 55 fastened to said drum and passing over the articulation $m$. The other end of the cable 55 is fastened to the articulation S which materializes the point of sight (Fig. 6).

Under these conditions, the angle of rotation of the drum 54 and, consequently, of the cam 53 is proportional to the variation of the distance $Sm$ (Fig. 6) and therefore to the variation of the angle of inclination of the rod $t$ on the plane passed through the articulation $m$ materializing the image of the point sighted.

The shape of the cam 53 is such that its radial variation as a result of a given inclination of the rod $t$ with respect to the normal to the plane of sliding movement of the articulation $m$, is proportional to the variation of the principal distance of the photographic objective for the same inclination of the perspective ray on the plane of the photograph.

This relation of proportionality is like that of the arms of any pivoting lever.

The rotation of the cam-carrying drum 54 is assured, during shortening movement of the length of the distance $Sm$, by an opposing spring which is not illustrated in the drawing. Cams 53 of different profile may be mounted on the drum 54. The ratio of the arms of lever 52 can be regulated, for example, by transversal displacement of the cam or by any other means, so as to permit adjustment of the distortion for different lenses of the same type, the law of variation of the latter being in practical effect the same as a coefficient of amplification for these various lenses.

The bridge $C_2$ (Fig. 3) which rolls on the cradle B carries a rigid piece 105 assuring the guidance of a frame 59 which carries the photograph $c$, said guidance being assured in a direction normal to the plane of rolling movement of the bridge $C_2$.

The movement of the frame 59 is controlled by a wire 56 or a simple strip rolling on the pulleys 57, 58 (Fig. 3), said wire being fastened at one point to the frame 59 and at another point to the carriage $C_1$, the arrangement of the pulleys 57, 58 and of the attachments being such that the amplitude of movement of the frame 59 on its guide 105 is equal to that of the carriage $C_1$. The assembly is balanced by a counterweight 60 so as to diminish the movement forces.

In the arrangement represented in Fig. 3, the frame 59 has an ascending movement whenever the carriage $C_1$ moves away from the plane of said frame, but it is evident that the combination could also be such that the relative movement occurs in the opposite direction.

The plane of the frame 59 and, consequently, of the photograph $c$ is normal to the tilting axis $a$—$a$ of the cradle B. Thus it follows that the photograph is moved in its plane of necessity in the two following perpendicular directions: $(a)$ by the bridge $C_2$, in the direction of the slides $g_2$ of the cradle B, and $(b)$ by the carriage $C_1$, in the perpendicular direction.

These movements are equal to the movement of the articulation $m$ materializing the observed point. The plane of each photograph is therefore fixed with respect to the frame 1, regardless of the inclination of the corresponding photographic lenses as well as of the value of the focal distance (principal distance) of said lenses. Consequently, the photographs can be observed simultaneously with the aid of a binocular microscope rigidly fixed to said frame, without the binocular microscope being provided with a variable optical system for adapting said microscope to different observational distances since, in accordance with the invention, these observational distances remain fixed.

The binocular microscope (Fig. 1) is composed of two like branches, each of which, considered in the order in which it is traversed by the light rays coming from the photograph, comprises the following optical devices:

A total reflection prism $P_1$ which groups the direction of the rays and reflects the line of sight parallel to the plane of the photograph;

A lens $O_1$ which provides a real image of the photograph in the plane of a reference mark $r$ (Fig. 3) which defines the line of sight;

A prism $P_2$ which deflects the line of sight normally to the plane of the photograph and to a prism $P_3$ which returns the light rays parallel to said plane;

A lens $O_2$ whose focus is coincident with the mark $r$ and which projects at infinity the image of the photograph and that of the mark $r$;

A Wollaston prism W which rotates around its center axis;

A lens $O_3$;

A reflecting prism $P_4$; and

An eye-piece $O_4$ constituting an angle observation telescope.

The two angle telescopes aimed one at each of the photographs of the stereoscopic pair are directed in two opposite directions and can slide in these directions so as to permit adjustment of the separation of the eye-pieces in accordance with the interpupillary distance of the eyes of the operator.

A prism at the top of the same optical system could replace prism $P_4$ so as to permit correct stereoscopic observation of either negative or positive views.

Likewise, the lens $O_3$ could be replaced by a variable displacement carrier of classical type permitting a variation of enlargement.

The separation of the eye-pieces can be accomplished by utilization of pivoting rhombuses, in accordance with the classical method of making eye-piece units. The eye-piece unit may comprise a permutable system of any suitable type permitting observation of the left-hand photograph with the right eye, and vice versa, as desired.

The optical equipment comprising the prism $P_1$, the lens $O_1$, the mark $r$ and the prism $P_2$ can be rotated about an axis normal to the plane of the photograph and coincident with the direction of the line of sight deflected by the prism $P_2$, in such manner as to permit the taking into account, for the observation, of variations in the distance of the two articulations S materializing the point of sight.

Likewise, with this end in view, there has been provided a micrometric translatory movement along the axis of the body of the telescope of the group of optical elements composed of the prism $P_1$, the lens $O_1$, the mark $r$, the prism $P_2$, the prism $P_3$ and the lens $O_2$. This movement is controlled, for example, by a knurled ring 15 or by any other appropriate means. A micrometric displacement of each of the photographs in its plane, in the direction controlled by the carriage $C_1$, is also provided.

This translatory movement, together with the preceding one, is designed to permit observation of the principal point of the photograph (the projection of the point of sight on the latter), whenever the rod $t$ occupies a position normal to the plane of sliding movement of the articulation $m$ materializing the image of the observed point.

In the embodiment of the invention given by way of example, this micrometric transverse displacement of the photograph with respect to the viewing microscope is obtained by moving the point of attachment of the flexible connection 56 to the frame 59 by means of a screw 61 which is actuated by a knurled knob 12 equipped with a graduated drum 62 (Fig. 3).

This relative micrometric movement of the photograph and of the point of sight of the microscope can be accomplished by other known means, for example, by rotation of a thick transparent strip with parallel surfaces placed between the lens $O_1$ and the photograph.

In the embodiment of the invention given by way of example, the photographs are assumed to be carried by a transparent support and are each illuminated by a lamp 16 carried by an arm 66 which both pivots and slides (Fig. 1) so as to take into consideration the possible variations in position of the line of sight of the microscope with respect to the frame of the apparatus.

Figure 5:
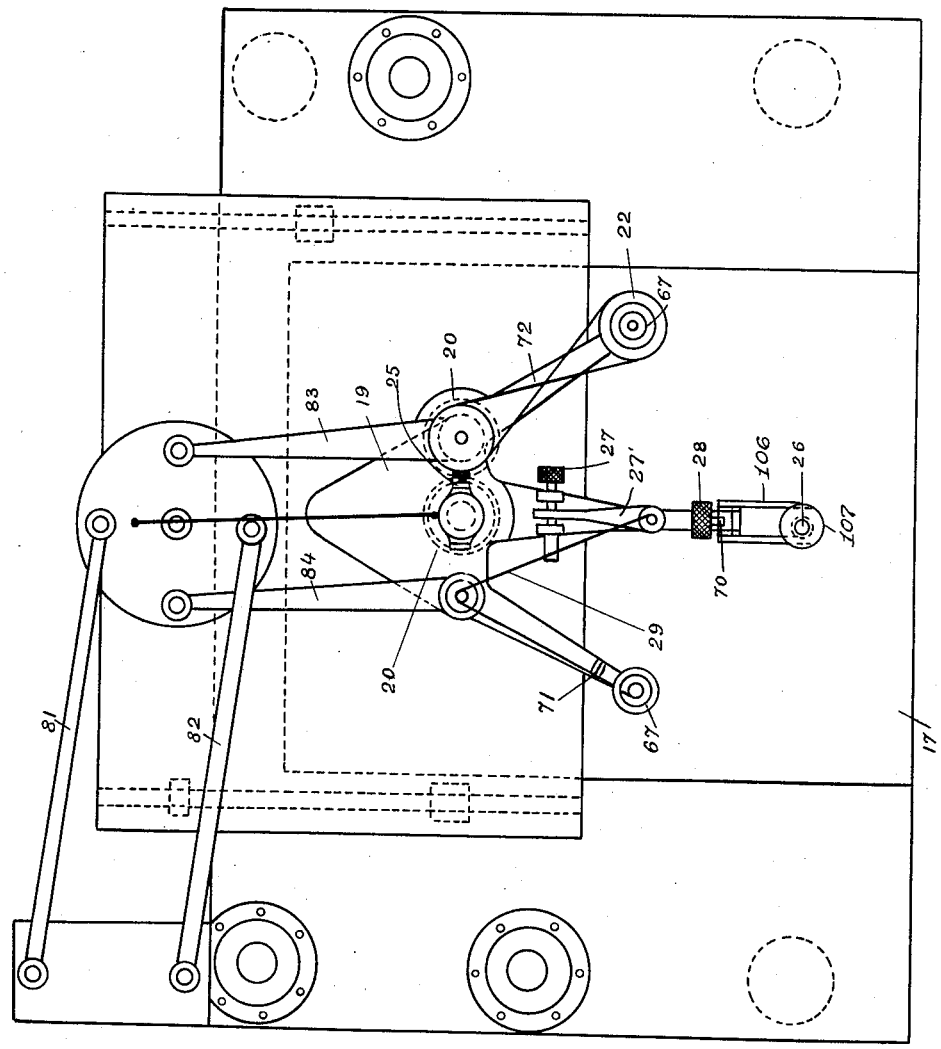
Fig. 5 is a plan view of the inscribing or recording means of the apparatus of Fig. 1.

The two rods $t$ materializing the perspective rays are coupled to an articulation M which materializes the image of the restored point, this articulation M being mounted on a vertically movable support 25 which is carried by a carriage 19 (Fig. 2), the latter being movable by means of two handles 67 in such manner as to permit translatory movement of said carriage over a horizontal plate 18 which constitutes the reference plane of the restitution. The guidance of this translatory movement is furnished by the action of an articulated double parallelogram 81—82, 83—84 (Fig. 5).

It is evident that this translatory movement could also be accomplished by some other appropriate means and, in particular, by a system of horizontal crossing carriages controlled by sliding screws, the vertical movement of the articulations M materializing the restored point being assured by a pedal.

The tracing device is carried by the carriage 19 and comprises the tracer 26 which records the plot of the restitution on a plane table 17. The tracer 26 is micrometrically adjustable in position with respect to the carriage 19. For this purpose, the tracer is mounted on a pivoting arm 27', which is controlled by a screwing device 27, and can slide lengthwise of this arm, under the action of a screw 70 which is turned by the milled knob 28 (Fig. 5). A lever 71 connected with the left-hand handle 67 permits raising of the tracer 26 by means of a cable 29 connected at one end to lever 71 and at the other end to a bifurcated lever 106 which cooperates with a disc 107 at the upper end of tracer 26 in the manner indicated in Figs. 2, 3 and 5. The right-hand handle 67 permits, by its rotation, the raising or lowering of support 25 by means of a system of screws and gears 29 (Fig. 4) on which it acts by means of a belt 72. The tracing or plot can be enlarged or reduced by means of a pantograph, connected for example to the tracing pencil 26.

In case the movement is controlled by a crank, the tracing can be accomplished on an auxiliary coordinograph according to known means.

The above described restitutional device also comprises means for assuring a considerable variation in height between the articulations S materializing the point of sight and M materializing the restored point.

Accordingly, as has been indicated above, the frame 1 rests on the restitution table 100 by means of screws 2 forming lifting jacks.

The support plane of these screws is a horizontal plane located in the middle of the space between the upper and lower horizontal planes which may be reached by the articulations M materializing the points of restitution, said leveling or wedging screws being provided with graduated drums which serve to regulate the inclination of the frame 1 and to effect approximate adjustment of the height of the articulations S. In order to permit, in accordance with this invention, a greater range of elevation of the articulations S and M, the device may comprise several sets of intermediary wedges which can be introduced between the jack screws 2 and the frame 1.

Likewise, the invention comprises correlatively a certain number of intermediate supports 3 of different heights for fixing the telescope on the frame 1 in such manner that, whatever the height of the frame may be, the eye-pieces $O_4$ of the telescope 80 remain substantially at the same elevation above the restitution table.

In like manner, the attachment of the guides of the frame 59 carrying the photograph on the carriages $C_2$ can be modified for the purpose of taking into consideration the vertical displacement of the telescope with respect to the frame 1. These wedging or adjusting means, of three different types, one for each of the above defined purposes, permit utilization of the same restitution apparatus for effecting the erection of aerial photographs at the very small scale of 1/500,000 or at the very large scale of 1/1000, like those of the cadastral plans. The range of vertical movement of the articulation M materializing the restored point is designed solely to take account of the differences in level of the latter, which permits a reduction of its amplitude.

The complete restitutional apparatus above described operates in the following manner:

The operator places two distinct negatives $c$ of the same zone of terrain, or of the same object, on their supporting frames 59, and adjusts the separation of the articulations S, by means of the handle 5 which controls the positions of carriages $C_3$, in such manner that this separation represents the distance between the two picture-taking points, reduced to the scale selected for the restitution. He then adjusts each branch of the telescope, by effecting rotation of the pivoting part thereof and by effecting the micrometric translation controlled by the ring 15, and simultaneously regulates the elevation of the negative by varying the length of the flexible connection 56 which connects the negative-carrying frame with the carriage $C_1$, by moving the position of its point of attachment to the latter by means of the screw 12 in such manner that the principal point $\omega$ of the negative (the foot of the perpendicular dropped from the nodal image point of the picture taking lens) is on the line of sight of the telescope whenever the rod $t$ is normal to the plane of movement of the articulation $m$.

This wedging or adjustment having been accomplished, the operator then acts on the screws 7 and 9 regulating the inclination of the plane of movement of each of the negatives, and on the orientation of each negative in its plane by rotation around the point $\omega$, in such manner as to be able to see simultaneously the two images of any desired point of the pair of negatives. The articulations M then describe an image similar to the terrain (a plastic image) when the operator moves them in space while maintaining a simultaneous viewing of the homologous points of the two negatives.

The spacial orientation of this plastic image is obtained by acting upon the leveling screws 2, until the difference in elevation of the articulations M for any two points of the terrain or of the object photographed, the position of which is known, is equal to the difference in level of said points reduced to the scale of restitution.

In order to trace the restitution the operator moves, by means of the handles 67 or by means of cranks in case of a control by screws, the carriage carrying the articulations M and acts upon the elevating mechanism of the piece 25 to which they are articulated, so as to maintain, during this movement, the stereoscopic observation of the various points of the line to be restored.

The contour lines are traced by immobilising the piece at the height corresponding to the elevation of said line at the scale of restitution and, by moving said piece horizontally while maintaining the stereoscopic viewing of the points of the image observed with the telescope.

What is claimed is:

1. Apparatus for the restitution of images from a pair of stereoscopic photographs comprising a pair of rectilinear rods each of which is pivotally articulated at a point intermediate its ends which materializes the point of sight, at a second point adjacent one end which materializes the image of the point observed and at a third point adjacent its other end which materializes the restored point, a pair of carriages adjustable toward and away from one another in a substantially horizontal plane to a spacing proportional to the distance between the points from which the photographs were taken, a cradle supported by each of said carriages and tiltable about a horizontal axis passing through the first named articulation point of one of said rods, a second pair of carriages slidably supported on said cradles for movement at right angles to said horizontal axes, a slide supported by each of said second pair of carriages and tiltable relatively thereto about an axis also passing through the first named articulation point of one of said rods and perpendicular to the associated horizontal axis, a third pair of carriages movably mounted on said slides and pivotally supporting said rods at said second named articulation points, said third pair of carriages being movable in planes established by the tilted positions of said cradles and slides, means carried by each of said second pair of carriages for supporting one of said stereoscopic photographs for movement in a fixed plane, connections between said photograph supporting means and said third pair of carriages for transmitting the movements of the latter to the photographs, and a binocular telescope for viewing said photographs.

2. Restitutional apparatus according to claim 1 including means for effecting micrometric displacement of each of the photograph supporting means in a direction perpendicular to the direction of movement of the associated one of said second pair of carriages.

3. Restitutional apparatus according to claim 1 including means for varying the distance between the two points of articulation of each of said rods materializing the image of the observed point and the point of sight in accordance with variations in the focal distance of the corresponding picture taking objective, whereby correction of the distortion of the picture taking objective due to inclination of the perspective ray on the principal axis is facilitated.

4. Restitutional apparatus according to claim 3 wherein the distortion correcting means comprises a second pair of slides mounted on said third pair of carriages and adjustable relatively thereto in directions at right angles to the planes of movement of said carriages, a lever pivotally mounted on each of said second pair of slides and having at one end a sliding universal connection with the associated rod constituting the articulation materializing the image of the observed point, a rotatable cam engaging said lever adjacent its opposite end, a drum rotatable with said cam, and a flexible connecting element fastened at one end to said drum and at the other end to the articulation materializing the point of sight, and passing over the articulation materializing the image of the observed point.

5. Restitutional apparatus according to claim 1 including a support for the restitutional reference plane, a frame carrying the photograph supporting means, the viewing telescope, the slide members and the carriages, and means for mounting said frame on said support including adjustable elements positioned substantially at the level of the restored space for varying the position of the frame relative to said restitutional reference plane.

6. Restitutional apparatus according to claim 5, said mounting means including a plurality of jackscrews having threaded engagement with said frame and seated against said support for elevating the frame above the restitutional reference plane in such manner that the elevation of the articulations of said rods materializing the points of sight above the plane of the articulations materializing the restored point corresponds substantially to the mean elevation of the photograph reduced to the scale of restitution.

GEORGES JEAN POIVILLIERS.

References Cited in the file of this patent

UNITED STATES PATENTS

| Number | Name | Date |
|---|---|---|
| 1,216,133 | Kammerer | Feb. 13, 1917 |
| 1,793,217 | Fourcade | Feb. 17, 1931 |
| 1,875,363 | Aldis | Sept. 6, 1932 |
| 1,925,207 | Santoni | Sept. 5, 1933 |
| 2,253,677 | Berchtold | Aug. 26, 1941 |
| 2,263,971 | King et al. | Nov. 25, 1941 |
| 2,303,099 | Wernstedt | Nov. 24, 1942 |
| 2,387,555 | Bauersfeld | Oct. 23, 1945 |
| 2,444,815 | Edison | July 6, 1948 |

FOREIGN PATENTS

| Number | Country | Date |
|---|---|---|
| 399,947 | Germany | July 31, 1924 |